United States Patent [19]

Riley

[11] Patent Number: 4,518,623
[45] Date of Patent: May 21, 1985

[54] POLYMERIC FILM COATING METHOD WITH CONTINUOUS DEPOSITION PRESSURE CONTROL

[76] Inventor: Thomas J. Riley, 905 Richmar Dr., Westlake, Ohio 44145

[21] Appl. No.: 604,968

[22] Filed: Apr. 27, 1984

Related U.S. Application Data

[62] Division of Ser. No. 444,486, Nov. 24, 1982, Pat. No. 4,495,889.

[51] Int. Cl.³ .............................................. B05D 5/12
[52] U.S. Cl. ..................................... 427/8; 427/255.6
[58] Field of Search ..................... 427/8, 9, 10, 255.6; 118/666, 667, 692, 690, 726

[56] References Cited

U.S. PATENT DOCUMENTS

| | | | |
|---|---|---|---|
| 3,397,085 | 8/1968 | Cariou et al. | 427/255.6 |
| 3,573,968 | 4/1971 | Loeb et al. | 427/255.6 |
| 3,895,135 | 7/1975 | Hofer | 427/255.6 |
| 4,167,915 | 9/1979 | Toole et al. | 118/692 |
| 4,287,224 | 9/1981 | Heimbach et al. | 427/8 |
| 4,291,244 | 9/1981 | Beach et al. | 427/255.6 |
| 4,388,342 | 6/1983 | Suzuki et al. | 427/9 |
| 4,389,229 | 6/1983 | Jang et al. | 118/692 |

Primary Examiner—Sadie L. Childs
Attorney, Agent, or Firm—Watts, Hoffmann, Fisher & Heinke Co.

[57] ABSTRACT

Method and apparatus are disclosed for coating substrates with a film polymer based on p-xylylene by vapor-phase polymerization. The apparatus monitors the monomer vapor pressure after pyrolization of the cyclic di-p-xylylene dimer, compares the measured pressure to a predetermined pressure needed to effect a completed vapor-phase polymerization reaction, and adjusts the temperature of vaporization in response to variations between measured pressure and the predetermined pressure.

3 Claims, 2 Drawing Figures

POLYMERIC FILM COATING METHOD WITH CONTINUOUS DEPOSITION PRESSURE CONTROL

This is a division of application Ser. No. 444,486, filed Nov. 24, 1982 U.S. Pat. No. 4,495,889.

TECHNICAL FIELD

The present invention relates generally to the art of coating of substrates with polymeric film, and more specifically to apparatus and methods for producing film polymers based on p-xylylene.

BACKGROUND ART

Apparatus and methods for producing film polymers based on p-xylylene and made by vapor-phase polymerization are known in the art. A typical vapor-phase deposition apparatus comprises a vaporizer, a pyrolizer, a deposition chamber, a condenser and a vacuum pump connected in series. The p-xylylene film coating process is carried out by vaporizing the substituted or unsubstituted cyclic dimer, di-p-xylylene, which is fed as a powder into the vaporization chamber. The dimer vapor is conducted into the pyrolizer where the dimer is cleaved to obtain the reactive diradicals. The diradicals or monomer vapor is passed into the deposition chamber where the vapor is condensed on a substrate or workpiece to form the p-xylylene film coating.

Unreacted or unpyrolized dimer vapor together with contained impurities pass through the deposition chamber into the condenser. The vacuum pump is used to draw the vapor through the system and to maintain the desired pressure conditions.

When the polymerization rate of the p-xylylene is too fast so that the monomer conversion is incomplete, the physical properties of the polymeric film are adversely affected. The tensile strength and insulating properties are lower than expected of the p-xylylene molecule. In addition, the film displays a nonuniform density and diminished resistance to molecular liquid and gas diffusion.

Attempts have been made in the past to regulate the temperature of the vaporizer in order to control the polymerization rate and thereby form a film coating having the desired physical properties. A conventional procedure has been to operate the apparatus with a set vaporizer temperature. This procedure frequently resulted in the formation of layers of polymer film having different and nonuniform physical properties. Another associated problem was simply that of setting the vaporizer temperature at a level which would result in the optimum polymerization rate. When it was observed from the formation of the film that the polymerization rate was too fast, the temperature of the vaporizer was lowered. The lowered temperature often required an unreasonably long time in order to produce a film of the desired thickness.

DISCLOSURE OF THE INVENTION

The present invention provides a new and improved p-xylylene coating apparatus and method which make it possible to control the polymerization rate and produce a film having the optimum physical properties expected of the polymer molecule. These physical properties include uniform density, high tensile strength, good insulating properties, and good resistance to molecular fluid flow, i.e. liquid and gas diffusion. The optimum physical properties are achieved while producing the film in the shortest possible cycle time.

The process of the invention for forming film based on p-xylylene generally comprises the steps of vaporizing di-p-xylylene dimer, pyrolizing the vaporized dimer to the monomeric diradicals, and depositing the film by vapor-phase polymerization of the monomer vapor, and is more particularly characterized by the improvement comprising the steps of continuously monitoring the polymerization rate and automatically adjusting the temperature of vaporization in response to variations of the polymerization rate from an optimum, predetermined rate in order to achieve a completed polymeric reaction in a minimum amount of time.

The process of the invention is based on the discovery that the polymerization rate of p-xylylene can be accurately monitored on a production basis by measuring the pressure of the monomer vapor after pyrolization. Accordingly, the preferred process is carried out by measuring the pressure of the monomer vapor after pyrolization and adjusting the vaporization temperature in response to pressure variations from an optimum predetermined pressure.

The invention also provides a method of forming p-xylylene polymer film based on p-xylylene which generally comprises vaporizing di-p-xylylene dimer, pyrolizing the vaporized dimer to the monomeric diradicals, and depositing the film by vapor-phase polymerization of the monomer vapors, and is more particularly characterized by the improvement comprising the steps of monitoring the pressure of the monomer vapor and adjusting the polymerization rate in response to pressure variations from an optimum pressure in order to produce a completed polymeric reaction in a minimum amount of time. Preferably, the polymerization rate is adjusted by adjusting the temperature of vaporization.

The apparatus of the invention for coating substrates with p-xylylene polymer film generally includes a vaporizer for vaporizing the cyclic di-p-xylylene dimer, a pyrolizer connected to the vaporizer for pyrolizing the vaporized dimer to the monomeric diradicals, and a deposition chamber connected to the pyrolizer for holding the workpieces to be coated and allowing the coated material to be deposited thereon, and is more particularly characterized by means for continuously measuring and adjusting the polymerization rate in order to achieve a completed polymeric reaction in a minimum amount of time.

In the preferred embodiment of the apparatus, the polymerization rate is measured by a pressure gauge connected between the pyrolizer and the deposition chamber. A computer is connected to the pressure gauge and is operative to adjust the temperature of the vaporizer in response to variations of pressure from a predetermined optimum pressure.

Other features and advantages and a fuller understanding of the invention will be had from the following detailed description and the accompanying drawings.

BEST MODE FOR CARRYING OUT THE INVENTION

Figure 1:
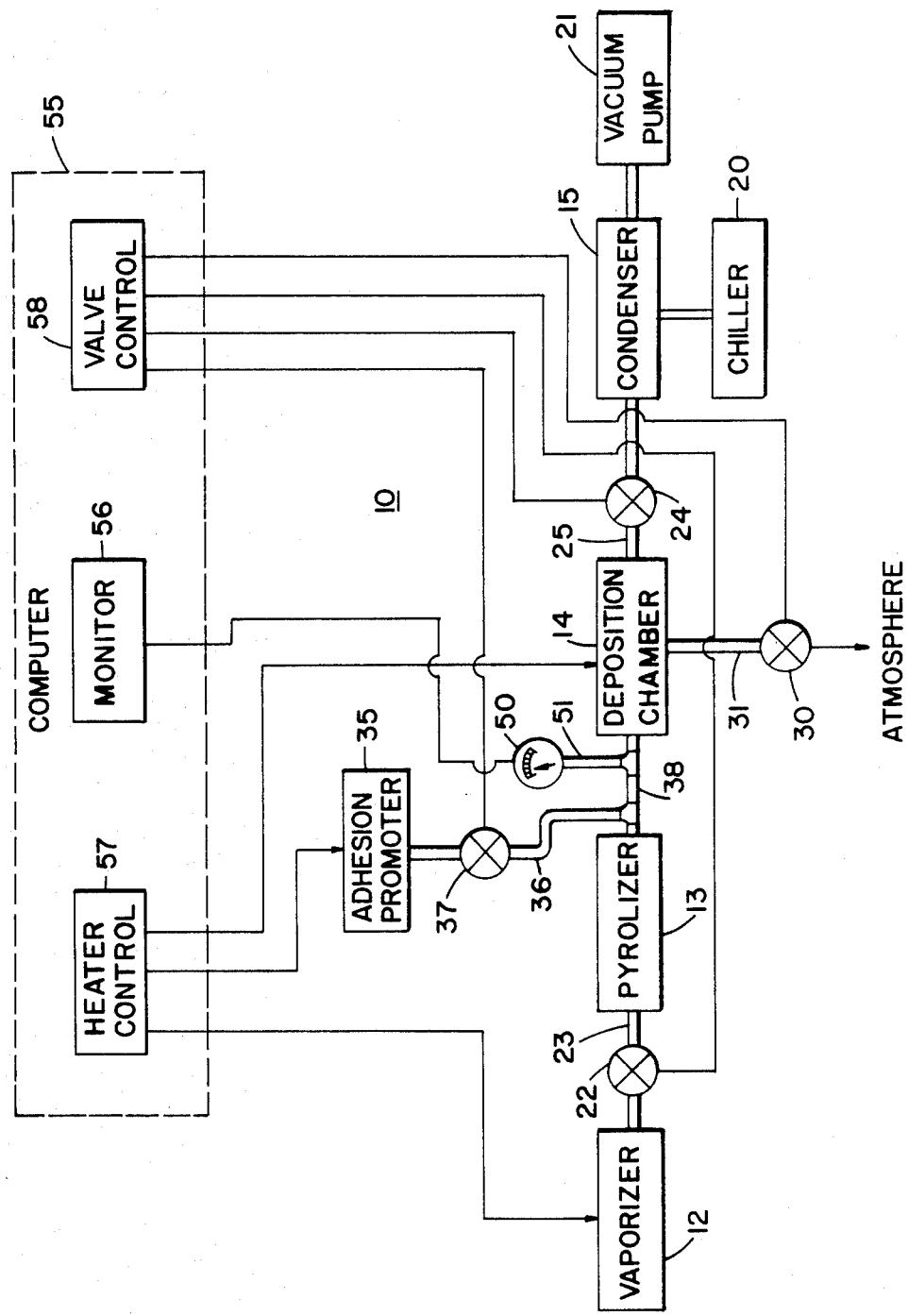
FIG. 1 is a block diagram of the apparatus of the invention.

Referring now to FIG. 1, the coating apparatus 10 embodying the invention comprises a vaporizer 12, a pyrolizer 13, a deposition chamber 14 and a condenser 15 connected in series by conduit. A chiller 20 is associated with the condenser 15 and a vacuum pump 21 is connected to the condenser in order to maintain the desired pressure conditions within the system and to draw the vapors from one chamber to the next.

As shown, a valve 22 is disposed between the vaporizer 12 and the pyrolizer 13 in the connecting conduit 23, and a valve 24 is disposed between the deposition chamber 14 and the condenser 15 in the connecting conduit 25. Another valve 30 in a conduit 31 is adapted to communicate the deposition chamber 14 to the atmosphere. A source 35 of an adhesion promoter is operatively connected to the deposition chamber 14 through a conduit 36, a valve 37 in the conduit 36, and the conduit 38 which communicates the pyrolizer 13 to the deposition chamber 14. The vaporizer 12, the pyrolizer 13, the deposition chamber 14, the adhesion promoter source 35, and the valves 22, 37 are provided with heaters (not shown) for controlling the temperature of fluid flow.

The arrangement thus far described is conventional and has been selected only for the purpose of disclosing one practical application of the invention. In operation the cyclic di-p-xylylene in powder form is introduced into the heated vaporizer 12. The vaporized dimer passes through the conduit 23 and the valve 22 into the pyrolizer 13 where the vapor is pyrolized to the monomeric diradicals. The p-xylylene diradical or monomer vapors are then passed into the deposition chamber 14 where they are deposited onto workpieces located in the chamber. Unreacted dimer vapor is drawn out of the deposition chamber 14 through the valve 24 and conduit 25 into the condenser 15.

As generally described above, the present invention provides for an improved operation characterized by the steps of continuously measuring the polymerization rate in the deposition chamber 14 and adjusting the polymerization rate to achieve a completed polymeric reaction in a minimum amount of time.

According to the invention, the polymerization rate in the chamber 14 is measured by a pressure gauge 50. The gauge 50 is connected by a conduit 51 to the conduit 38 leading from the pyrolizer 13 into the deposition chamber 14. Thus connected, the gauge 50 senses the pressure of the monomer vapor which is an effective way of determining the arrival rate of monomer molecules in the deposition chamber 14.

Figure 2:
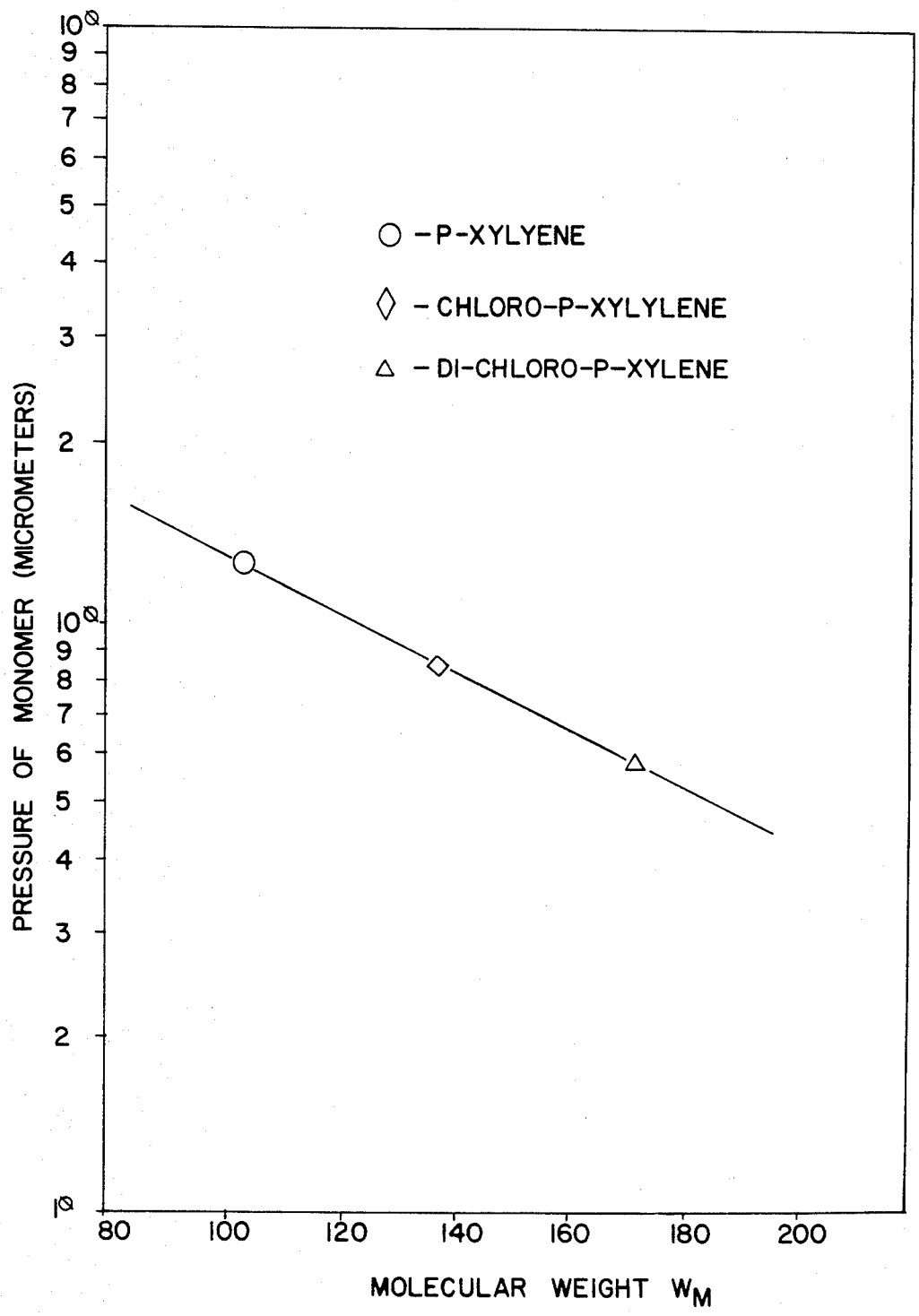
FIG. 2 is a graph on a logrithmic scale showing pressure of p-xylylene monomer vapor in micrometers as a function of molecular weight.

The optimum pressure of the monomer vapors which will result in a complete polymeric reaction depends upon the molecular weight of the monomer and the physical dimensions of the coating apparatus being used, i.e. the dimensions of the vaporizer, pyrolizer, deposition chamber and the connecting conduits. The monomer pressure that will achieve the optimum polymerization rate for any particular p-xylylene coating material and apparatus can be determined by calculation or by experimentation. FIG. 2 is a logrithmic plot of the pressures of three different p-xylylene monomer vapors produced in an apparatus of known dimensions verses the molecular weights of those monomers. The three coating materials represented in FIG. 2 are unsubstituted p-xylylene, mono-chloro-p-xylylene and di-chloro-p-xylylene. The monomer pressures are those which will result in a completed polymeric reaction in the apparatus. From this graph, the optimum monomer pressure which should be maintained in the apparatus for a particular molecular weight of monomer coating material can be determined. By way of example, it will be seen from FIG. 2 that when depositing unsubstituted p-xylylene monomer having a molecular weight of about 104, the optimum monomer pressure in the apparatus represented by the graph should be about 125 micrometers.

In accordance with the invention, the apparatus 10 includes a computer 55 which comprises a pressure monitor 56, a heater control 57, and a valve control 58. The monitor 56 of the computer 55 is operatively connected to the pressure gauge 50. The heater control 57 is connected to the internal heaters (not shown) of the vaporizer 12, the deposition chamber 14 and the adhesion promoter source 35. The valve control 58 is operatively connected to the valves 22, 24, 30, 37.

In operation, the computer 55 monitors the monomer vapor pressure of the pyrolized dimer and compares the monitored pressure to the desired pressure needed to obtain a completed polymeric reaction in the deposition chamber 14. The computer continuously adjusts the temperature of the vaporizer 12 in response to variations of the actual monomer pressure from the desired monomer pressure. In this way, the computer continually monitors and adjusts the polymerization rate to achieve a completed polymeric reaction in the deposition chamber in a minimum amount of time.

EXAMPLE

An apparatus constructed in accordance with the present invention is used to coat substrates having a total surface area of 100,000 square centimeters with mono-chloro-p-xylylene. The volume of the coating apparatus components are as follows:

| Unit | Volume ($CM^3$) |
| --- | --- |
| vaporizer | 240 |
| pyrolizer | 480 |
| deposition chamber | 11,506 |
| connecting tubes | 380 |

From FIG. 2, the optimum monomer pressure of the mono-chloro-p-xylylene required to obtain a completed polymeric reaction in a minimum time is about 85 micrometers. 49 grams of the mono-chloro-di-p-xylylene cyclic dimer is placed in the vaporizer and the apparatus is operated at the determined pressure to coat the substrate. The coating operation requires about 3.7 hours to obtain a coating approximately 10 to 20 KA°.

Other modifications and variations of the invention will be apparent to those skilled in the art in light of the foregoing detailed disclosure. Therefore, it is to be understood that, within the scope of the appended claims, the invention can be practiced otherwise than as specifically shown and described.

I claim:

1. In a method of coating substrates with polymer film based on p-xylylene which includes vaporizing di-p-xylylene dimer, pyrolizing the vaporized dimer to the monomeric diradicals, and depositing the film by vapor-phase polymerization of the monomer vapor, the improvement comprising the steps of continuously monitoring the monomer vapor pressure after pyrolization and automatically adjusting the temperature of vaporization to reduce variations in the actual monomer vapor pressure from an optimum pressure in order to achieve a completed polymeric reaction in a minimum amount of time.

2. In a method of coating substrates with polymer film based on p-xylylene which includes vaporizing di-p-xylylene dimer, pyrolizing the vaporized dimer to the monomeric diradicals, and depositing the film by vapor-phase polymerization of the monomer vapor, the improvement comprising the steps of continuously monitoring the pressure of the monomer vapor after pyrolization and continuously adjusting the vaporization rate of the p-xylylene into a dimer in response to the variations of actual pressure of the pyrolized monomer vapor from an optimum pressure to reduce variations between the measured and optimum pressure in order to produce a completed polymeric reaction in a minimum amount of time.

3. The improvement as claimed in claim 2 in which the step of adjusting a polymerization rate comprises adjusting the temperature of vaporization.

* * * * *